April 14, 1959     A. J. JOHNSON     2,881,788
VALVE WHICH CLOSES AGAINST INTERNAL PRESSURE
Filed Oct. 5, 1953     2 Sheets-Sheet 1
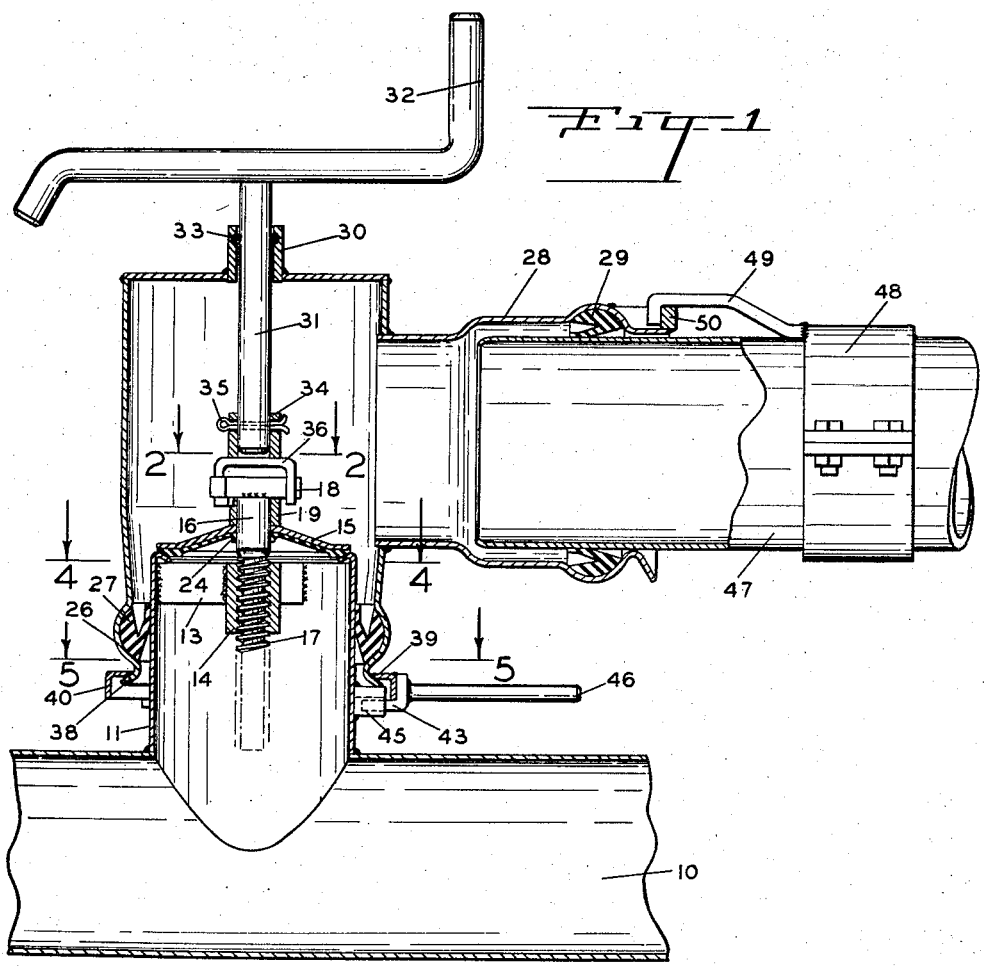
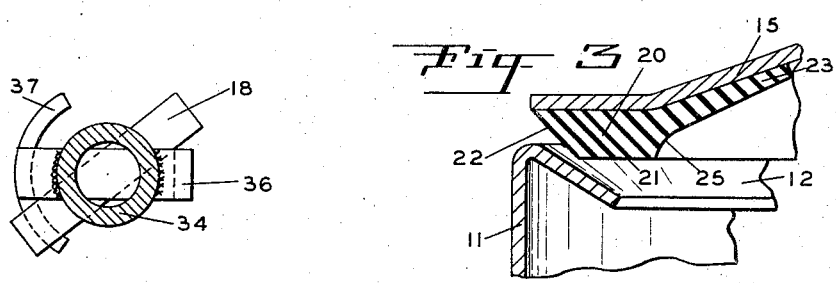
INVENTOR.
Alexander J. Johnson
BY
Bucklern and Cheatham
ATTORNEYS

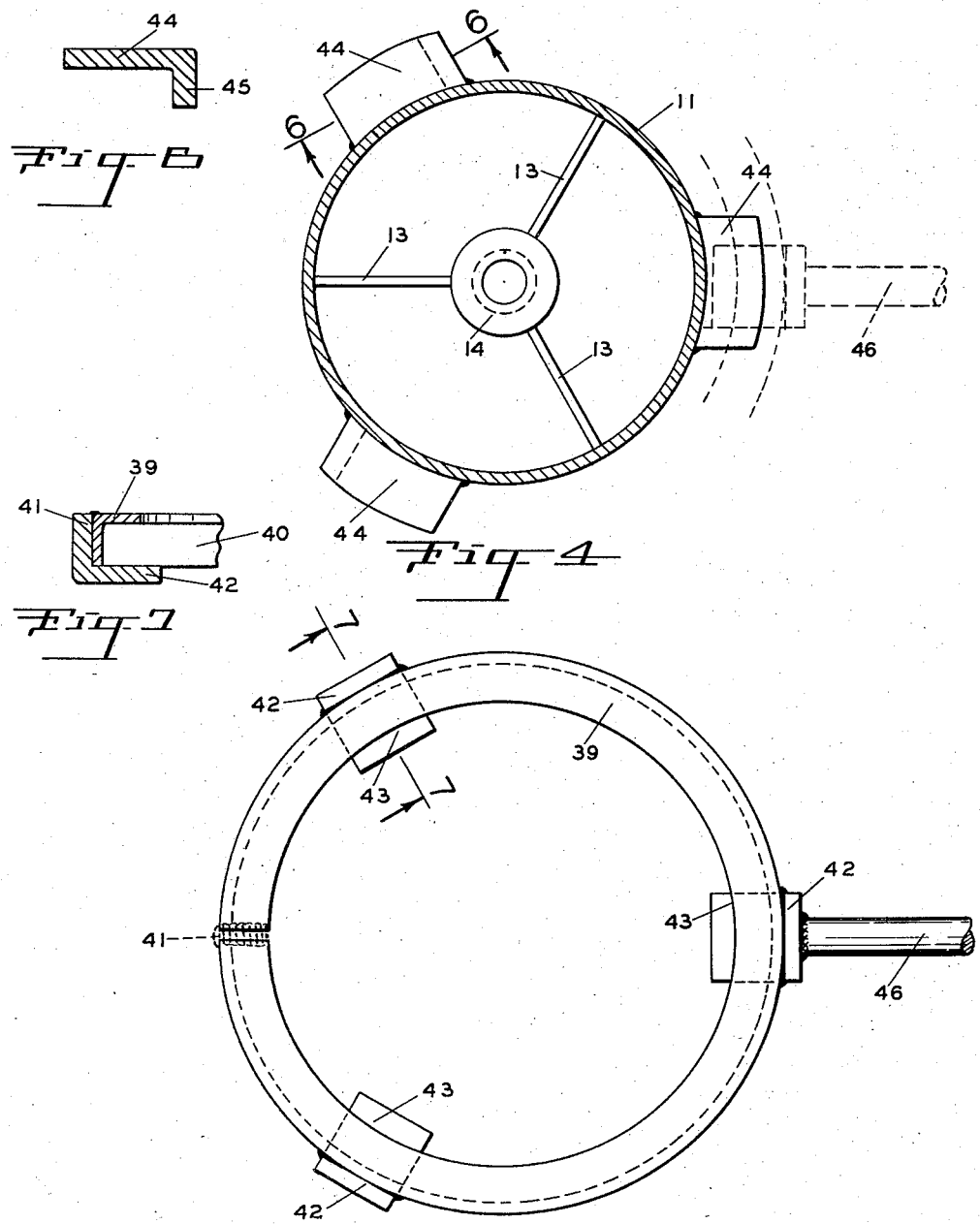

United States Patent Office 2,881,788
Patented Apr. 14, 1959

2,881,788

VALVE WHICH CLOSES AGAINST INTERNAL PRESSURE

Alexander John Johnson, Eugene, Oreg., assignor, by mesne assignments, to R. H. Pierce Manufacturing Co., Eugene, Oreg., a corporation of Oregon Application October 5, 1953, Serial No. 384,270

3 Claims. (Cl. 137—321)

The present invention comprises an improvement in valves for conduits for conveying fluids under pressure, the invention being of particular utility in connection with portable, field irrigating, sprinkling systems. The valve of the present invention is principally characterized by closing against the pressure of the fluid within the conduit.

A principal object of the present invention is to provide a valve of the character described which may be closed easily against the internal force, and which when fully closed remains sealed throughout its circumference.

A further object of the present invention is to provide a valve of the character described, which includes an outwardly located valve cap presenting very little in the way of protruding parts so as to reduce the possibility of livestock or farm vehicles damaging the valve when it comprises a part of a field irrigating or sprinkling system.

A further object of the present invention is to provide a construction of the character described which comprises valve operating means including a crank, a valve stem, separable means for attaching the crank to the valve stem, and a fitting in which the crank is rotatably and slidably mounted, said fitting being adapted to be sealed to an end of a conduit in which the valve is located. A feature of the present invention resides in the provision of means for quickly detachably mounting the fitting on the conduit in any desired relative position of rotation, whereby the fitting may comprise an elbow having a laterally directed end which may be directed radially in any direction.

A further object of the present invention is to provide a construction of the character described which is principally composed of sheet metal parts, thereby reducing the cost of the valve and facilitating its construction.

The foregoing and other objects and advantages of the present invention will be more readily apparent from inspection of the accompanying drawings taken in connection with the following specification wherein like numerals refer to like parts throughout.

In the drawings,

Fig. 1 is a vertical section through a portion of a fluid conduit including a branch outlet in which the valve of the present invention is located, the valve operating means, and a portion of a detachably connected branch conduit;

Fig. 2 is a horizontal section, on an enlarged scale, taken substantially along line 2—2 of Fig. 1;

Fig. 3 is an enlarged vertical section through a portion of the valve;

Fig. 4 is a horiizontal section taken substantially along the line 4—4 of Fig. 1, on an enlarged scale, with the valve operating means removed;

Fig. 5 is a horizontal section taken substantially along line 5—5 of Fig. 1, on an enlarged scale, showing separable ring lug locking means removed from the valve operating fitting;

Fig. 6 is a vertical section taken substantially along line 6—6 of Fig. 4; and

Fig. 7 is a vertical section taken substantially along line 7—7 of Fig. 5.

The invention is herein illustrated as being associated with a field irrigating system comprising a main conduit 10 which is usually permanently positioned in a field and connected to a pump at one end. The main conduit is provided with branch outlets 11 at suitable intervals, the lengths of which depend upon the position of the main conduit 10 with respect to the ground level. If the main conduit 10 is laid on the ground surface, the branch conduits 11 are usually quite short as illustrated, but if the main conduit is buried beneath the ground the branch conduits 11 are of suitable length to bring their upper ends flush with or projecting slightly above the surface of the ground.

In accordance with the present invention the conduit 11 is provided at its outer end with a coaxial valve seat, in this instance the valve seat 12 comprising the outer frusto-conical surface of an inwardly inclined annular flange provided by rolling the end of the conduit inwardly at an angle of about forty-five degrees. Valve stem supporting means comprising a plurality of radial arms 13 are mounted in the end of the conduit beneath the inner edge of the valve seat, the inner ends of the arms being connected to a coaxially positioned internally threaded valve stem support 14. A valve cap 15 is positioned upwardly from the valve seat, the valve cap in this instance comprising an upwardly convex disk-shaped member formed of heavy sheet metal and including a horizontal, peripheral flange portion. The valve cap is provided with a coaxial central aperture through which a cylindrical portion 16 of a valve stem loosely extends, the valve stem comprising an inner threaded portion 17 threadedly engaged with the support 114 and an outer cross-head bar 18 welded to the outer end of the portion 16. The valve stem comprises a cylindrical head against which the valve cap is held by the fluid pressure. The head may be provided by welding a sleeve 19 to the valve stem and the cross-head bar.

In accordance with the present invention, the valve cap has affixed thereto a gasket in the form of an annulus 20 of deformable rubberous material and of substantial thickness in the axial direction of the valve, the inner and outer diameters of the annulus being substantially the same as the inner and outer diameters of the valve seat 12. The exposed inner surface 21 of the annulus is of substantial width and lies in a substantially horizontal, radial plane.

The annulus comprises an outer frusto-conical surface 22 diverging outwardly from the surface of the valve seat 12 at an angle in the range of about ten to about twenty degrees. The gasket comprises a membrane portion 23 integral with the annulus 20 and terminating in an annular, axially projecting lip 24 snugly embracing the cylindrical portion 16 of the valve stem. The boundary between the surface 21 and the surface of the membrane 23 is defined by an abrupt shoulder 25. The surfaces 21 and 22 define a relatively sharp edge which first contacts the surface of the valve seat, and frictionally prevents the valve cap 15 from rotating while the annulus is being compressed. The edge between the surfaces 21 and 22 of the annulus 20 first approaches the surface of the valve seat 12, defining therewith a Venturi throat. In accordance with the principle of a Venturi there is a high velocity with lessened pressure at the point of constriction, and a progressively lessening velocity and increasing pressure outwardly along the surface 22. The fluid pressure tends to keep the rubber annulus from contacting the valve seat until a position is reached at which the internal pressure working against the shoulder 25 suddenly forces the entire annulus against the valve seat throughout the periphery of the valve. The rubberous gasket portion 24 permits canting and slight axial, inward movement of the cap so that such seating may occur. Thereafter, the screw may be rotated to some further extent to flatten the annulus against the valve seat in an ever increasing area to render the valve leakproof in spite of possible surges, vibrations and accidental knocking against the pipes and the valve cover. Since the metal cap 15 is of substantially the same external diameter as the pipe 11, and because of the acute angle relationship of the surface 21 to the surface 22, there is sufficient metal backing to prevent the annulus from being extruded as would be the case if the relative angle between the surface 22 and the valve seat 12 were substantially increased. When the valve is sealed the pressure against the shoulder 25 causes the rubberous material to be squeezed tightly against the valve seat to prevent leakage, yet the construction is such as to permit opening without frictional resistance which would tend to destroy the sealing surface of the gasket. The protruding lip 24 is forced against the valve stem portion 16 to seal this portion of the valve.

The valve operating means comprises a detachable fitting including a vertical bell portion 26 adapted to receive the branch conduit 11 and to be sealed thereagainst by means of a suitable gasket 27, the fitting comprising an elbow having a horizontally directed bell portion 28 containing a sealing gasket 29. The fitting comprises welded sheet metal sections and a vertical journal sleeve 30 projecting outwardly in coaxial alignment with the valve stem when the fitting is mounted on the conduit 11. The sleeve 30 rotatably and slidably mounts the operating stem 31 of a crank including a suitable external handle 32. A rubberous O-ring gasket 33 is mounted in a groove in the interior surface of the sleeve 30 and embraces the crank shaft 31 so as to prevent leakage past the crank shaft. The inner end of the crank shaft 31 is detachably connected to a tubular extension 34 by separable means such as the cotter pin 35 whereby replacement of broken or damaged parts may be facilitated. The inner end of the extension 34 is welded to a U-shaped member 36 defining an inwardly projecting fork, the arms of which are adapted to straddle the cross-head bar 18. The lower end of one tine of the member 36 carries an arcuate latching member 37 having opposed arms, either of which may be engaged under one of the arms of the cross-head bar 18 as illustrated in Fig. 2. By reason of this construction the crank is prevented from being displaced from the cross-head bar in an axial direction when the valve is being opened or closed.

In accordance with the present invention the valve operating fitting is detachably connected to and sealed to the conduit 11 by means as follows: The lower end of the vertical portion of the fitting comprises an annular flange 38 upon which is rotatably seated a locking ring having an annular horizontal flange 39 and an annular vertical flange 40. As indicated in Fig. 5, the locking ring is preferably formed as a split ring so that it may be threaded onto the flange 38, thereafter the ends of the rings being joined together by welding indicated at 41. The locking ring supports a plurality of angularly spaced locking lugs comprising short sections of angle bars having their vertical legs 42 welded to the outer surface of the flange 40 and their horizontal legs 43 projecting inwardly beneath the lower edge of the flange 40. The inwardly projecting legs 43 comprise locking lugs which are adapted to be removably associated with catch lugs welded to the outer surface of the conduit 11, each comprising a horizontal portion 44 and a vertical portion 45. The locking ring may be rotated by a radially projecting handle 46 conveniently welded to one of the legs 42. In locating the fitting, the fitting is slid downwardly over the conduit 11 until the flange 38 rests on the upper surfaces of the portions 44, whereupon the locking ring may be rotated by the handle 46 until the lugs 43 engage the vertical flanges 45 of the catch lugs. By reason of this construction it will be apparent that the horizontally directed portion 28 of the elbow may be directed angularly in any desired direction.

When utilized as a portion of a field irrigating system, the horizontally directed portion 28 is adapted to receive the first section 47 of a portable field irrigating pipeline. In accordance with the preferred practice, the pipe section 47 supports a removable collar 48 to which is welded a hook 49 adapted to engage a catch 50 mounted on the upper edge of the portion 28. The pipe 47 may be thrust inwardly a short distance from the position illustrated in Fig. 1 to permit rotative separation of the hook from the catch and subsequent withdrawal of the pipe section.

It will be appreciated that the demountable valve operating fitting may be easily carried about and associated with any one of a plurality of spaced branch outlets along the main conduit 10, each of the outlets being provided with a valve constructed in accordance with the present disclosure. When the valves are exposed by disassociation of the operating fitting there is very little apparatus exposed to possible damage by livestock or farm equipment. More important, however, is the fact that the main conduit is free of reentrant pockets such as are necessarily present in prior art constructions employing inwardly mounted valves which close upwardly against a valve seat with the aid of the interior force. In such prior art constructions there are reentrant upwardly facing pockets into which leaves, mud and other debris may drop, and into which sow bugs and other insects may crawl. With such prior art devices it was necessary to connect a demountable operating fitting, open the valve to flush out such foreign matter, and then connect the portable conduit to the fitting, so as to avoid having foreign matter forced into and plug sprinklers attached to the portable conduit. A further drawback in such devices is that even if the user took the precaution to thus flush out foreign material, the foreign material would lodge in the gaskets 27 and 29, eventually destroying their effectiveness.

Having illustrated and described a preferred embodiment of the present invention, it should be apparent to those skilled in the art that the same permits of modification in arrangement and detail. I claim as my invention all such modifications as come within the true spirit and scope of the appended claims.

I claim:

1. In a valve for a conduit for fluid under pressure, an annular valve seat formed by an inwardly inclined, frusto-conical surface of said conduit, a valve cap located outwardly of said seat from said conduit, means to move said valve cap axially with respect to said valve seat comprising a coaxial, rotatable valve stem extending through said valve cap, means mounting said valve cap so that it is rotatable on said valve stem, said valve cap being capable of canting and moving coaxially inward with respect to said valve stem, and a coaxial, annular gasket of rubberous material capable of being deformed by fluid pressure, said gasket being coaxially mounted upon and completely covering the inner surface of said valve cap, said gasket comprising an integral peripheral portion axially aligned with said valve seat and having an outer surface lying at an acute angle to said valve seat surface, a contiguous surface defining a sharp edge with said outer surface and extending substantially radially with respect to said valve stem, and an inner surface extending longitudinally of said conduit toward said cap, and said gasket also comprising an integral inner portion extending axially inward along said valve stem and closely surrounding said valve stem so as to be constricted by internal fluid pressure to grip said valve stem and hold said cap and gasket thereon.

2. The construction set forth in claim 1 wherein the end of said conduit is turned inwardly to provide said valve seat surface.

3. The construction set forth in claim 1 wherein said means to move said valve cap axially comprises a spider mounted within said conduit and including a coaxial, inwardly threaded valve stem support, and said valve stem comprises a threaded inner end engaged with said support.

References Cited in the file of this patent
UNITED STATES PATENTS

| | | |
|---|---|---|
| 1,733,180 | Biedermann | Oct. 29, 1929 |
| 2,051,919 | Tow | Aug. 25, 1936 |
| 2,346,938 | Oravec | Apr. 18, 1944 |
| 2,414,908 | Smith | Jan. 28, 1947 |
| 2,447,510 | Langdon | Aug. 24, 1948 |
| 2,603,446 | Harding | July 15, 1952 |
| 2,665,928 | Omon et al. | Jan. 12, 1954 |